(12) United States Patent
Johnson et al.

(10) Patent No.: US 11,754,680 B2
(45) Date of Patent: *Sep. 12, 2023

(54) OPTICAL SYSTEM THAT DETECTS AND BLOCKS BACKSCATTER

(71) Applicant: Raytheon Company, Waltham, MA (US)

(72) Inventors: Timothy P. Johnson, Waltham, MA (US); Matthew J. Klotz, Waltham, MA (US); Ian S. Robinson, Waltham, MA (US)

(73) Assignee: RAYTHEON COMPANY, Waltham, MA (US)

( * ) Notice: Subject to any disclaimer, the term of this patent is extended or adjusted under 35 U.S.C. 154(b) by 348 days.

This patent is subject to a terminal disclaimer.

(21) Appl. No.: 16/853,051

(22) Filed: Apr. 20, 2020

(65) Prior Publication Data
US 2021/0325516 A1 Oct. 21, 2021

(51) Int. Cl.
*G01S 7/48* (2006.01)
*G01S 7/481* (2006.01)
*G01S 17/89* (2020.01)

(52) U.S. Cl.
CPC ............ *G01S 7/4816* (2013.01); *G01S 17/89* (2013.01)

(58) Field of Classification Search
CPC ...... G01S 7/4816; G01S 17/89; G01S 7/4868; G01S 17/10
See application file for complete search history.

(56) References Cited

U.S. PATENT DOCUMENTS 4,129,775 A * 12/1978 O'Meara ................. G01S 7/491
250/203.1
5,192,978 A 3/1993 Keeler
(Continued)

FOREIGN PATENT DOCUMENTS

EP 0762143 A1 * 3/1997
JP H08122435 A 5/1996
(Continued)

OTHER PUBLICATIONS

International Search Report and Written Opinion from related PCT Application No. PCT/US2020/063206 dated Feb. 18, 2021.
(Continued)

*Primary Examiner* — Hovhannes Baghdasaryan
(74) *Attorney, Agent, or Firm* — Burns & Levinson, LLP; Joseph M. Maraia

(57) ABSTRACT

A LADAR system includes a transmitter configured to emit a directed optical signal. The LADAR system includes an optical aperture through which the directed optical signal is emitted. The optical aperture receives a return optical signal that is based on the directed optical signal. The system includes a detector to generate a measurement by comparing an attribute of the return optical signal to a predefined threshold. The measurement is based on an amount of backscatter in the return optical signal. The system includes an obstructive element that is controllable, based on the measurement, to move either into or out of a path of the return optical signal. The obstructive element is configured to block the return optical signal at least partly. The system includes a focal plane located in the path of the return optical signal. The obstructive element is disposed between the optical aperture and the focal plane.

20 Claims, 3 Drawing Sheets

(56) References Cited

U.S. PATENT DOCUMENTS

| | | | |
|---|---|---|---|
| 5,206,698 A | 4/1993 | Werner et al. | |
| 5,767,519 A | 6/1998 | Gelbwachs | |
| 5,795,047 A * | 8/1998 | Sannohe | H04N 9/3105 359/650 |
| 5,831,762 A | 11/1998 | Baker et al. | |
| 6,020,994 A | 2/2000 | Cook | |
| 6,178,047 B1 | 1/2001 | Cook | |
| 6,422,704 B1 * | 7/2002 | Gyoten | H04N 9/3194 348/E17.005 |
| 6,548,795 B1 * | 4/2003 | Atkinson | G02B 21/241 250/201.4 |
| 6,792,028 B2 | 9/2004 | Cook et al. | |
| 6,919,990 B2 * | 7/2005 | Anikitchev | G02B 27/1026 359/636 |
| 6,963,354 B1 | 11/2005 | Scheps | |
| 7,345,744 B2 | 3/2008 | Halmos et al. | |
| 7,556,389 B2 | 7/2009 | Cook | |
| 7,589,896 B2 | 9/2009 | Cook et al. | |
| 7,648,249 B2 | 1/2010 | Cook | |
| 7,656,526 B1 | 2/2010 | Spuler et al. | |
| 7,741,618 B2 | 6/2010 | Lee et al. | |
| 7,813,644 B2 | 10/2010 | Chen et al. | |
| 8,203,472 B2 | 6/2012 | Robinson | |
| 8,203,715 B2 | 6/2012 | Robinson | |
| 8,269,950 B2 | 9/2012 | Spinelli et al. | |
| 8,277,060 B2 | 10/2012 | Cook | |
| 8,338,785 B2 | 12/2012 | Ray | |
| 8,536,503 B2 | 9/2013 | Cook et al. | |
| 8,543,009 B2 | 9/2013 | Bulot et al. | |
| 8,577,182 B1 | 11/2013 | Robinson | |
| 8,759,735 B2 | 6/2014 | Cook et al. | |
| 8,792,163 B2 | 6/2014 | King et al. | |
| 8,767,187 B2 | 7/2014 | Coda et al. | |
| 8,787,768 B2 | 7/2014 | Klotz et al. | |
| 8,801,202 B2 | 8/2014 | Cook | |
| 8,824,055 B2 | 9/2014 | Cook | |
| 8,947,647 B2 | 2/2015 | Halmos et al. | |
| 9,121,758 B2 | 9/2015 | Cook | |
| 9,151,958 B2 | 10/2015 | Robinson | |
| 9,166,686 B2 | 10/2015 | Cook | |
| 9,236,703 B2 | 1/2016 | Filgas et al. | |
| 9,279,724 B2 | 3/2016 | Robinson et al. | |
| 9,365,303 B2 | 6/2016 | Robinson | |
| 9,404,792 B2 | 9/2016 | Shimon et al. | |
| 9,500,518 B2 | 11/2016 | Cook | |
| 9,658,337 B2 | 5/2017 | Ray et al. | |
| 9,922,251 B2 | 3/2018 | Robinson | |
| 10,228,283 B2 * | 3/2019 | Nath | G01J 3/2823 |
| 10,330,913 B2 * | 6/2019 | Stoppe | G02B 21/06 |
| 10,392,136 B2 | 8/2019 | Leatham et al. | |
| 10,520,437 B1 | 12/2019 | Stebbins et al. | |
| 2008/0210881 A1 | 9/2008 | Harris et al. | |
| 2016/0345820 A1 * | 12/2016 | Frisken | A61B 3/0025 |
| 2018/0106900 A1 * | 4/2018 | Droz | G01S 17/08 |
| 2018/0156659 A1 * | 6/2018 | Droz | G01J 1/0214 |
| 2019/0113735 A1 | 4/2019 | Johnson | |

FOREIGN PATENT DOCUMENTS

| | | | |
|---|---|---|---|
| JP | 2005331273 A * | 12/2005 | G01S 17/10 |
| JP | 2013113669 A | 6/2013 | |
| WO | WO-2019099166 A1 * | 5/2019 | G01S 17/931 |

OTHER PUBLICATIONS

International Preliminary Report on Patentability for International Application No. PCT/US2020/063206, dated Oct. 25, 2022, (9 pages).

* cited by examiner

OPTICAL SYSTEM THAT DETECTS AND BLOCKS BACKSCATTER

TECHNICAL FIELD

This specification describes examples of optical systems configured to detect backscatter in an optical signal and to block at least some of the backscatter.

BACKGROUND

Laser detection and ranging (LADAR) or light detection and ranging (LIDAR) systems use pulses of light to measure distance. By pulsing a transmitter, such as a laser emitter, a burst of light is emitted, which may be directed through a lens, lens assembly, optic, or optical element. The burst of light travels downrange to a field and reflects therefrom, returning to a focal plane in the LADAR or LIDAR system. The time it takes for the pulse of light to return to the focal plane may be measured, and a distance may be determined based on the timing measurement.

SUMMARY

An example LADAR system includes a transmitter configured to emit a directed optical signal. The LADAR system includes an optical aperture through which the directed optical signal is emitted. The optical aperture receives a return optical signal that is based on the directed optical signal. The LADAR system includes a detector to generate a measurement by comparing an attribute of the return optical signal to a predefined threshold. The measurement is based on an amount of backscatter in the return optical signal. The LADAR system includes an obstructive element that is controllable, based on the measurement, to move either into or out of a path of the return optical signal. The obstructive element is configured to block the return optical signal at least partly. The LADAR system includes a focal plane located in the path of the return optical signal. The obstructive element is disposed between the optical aperture and the focal plane. The example LADAR system may include one or more of the following features, either alone or in combination.

The transmitter configured to emit a directed optical signal may include a laser. The LADAR system may include a mirror to reflect at least a portion of the return optical signal to the detector. The return optical signal may pass through the mirror to the focal plane. The obstructive element may include a shutter. The obstructive element may include a mirror. The mirror may be a fold mirror. The LADAR system may include an imager to receive the return optical signal and to generate an image of a scene and target. The image may be based on at least a portion of the return optical signal. The focal plane may be configured to record the image.

The optical aperture may include a first pupil plane. The LADAR system may include a second pupil plane. The second pupil plane may be an optical conjugate of the first pupil plane. The LADAR system may include a mirror at the second pupil plane. The mirror may be configured to reflect at least a portion of the return optical signal to the detector. The LADAR system may include a mirror having a hole through which the directed optical signal passes. The LADAR system may include an afocal foreoptic to increase the optical aperture size and decrease the directed optical signal divergence.

An example method shields a focal plane of a camera within a laser detection and ranging system. The method includes transmitting, through an optical aperture, a directed optical signal to a field. The method includes receiving, through the optical aperture, a return optical signal based on the directed optical signal. The method includes generating a measurement by comparing an attribute of the return optical signal to a predefined threshold. The method includes controlling an obstructive element to move into or out of a path of the return optical signal based on the measurement. The obstructive element may block at least a portion of the return optical signal from reaching a focal plane. The example method may include one or more of the following features, either alone or in combination.

The method may include transmitting the directed optical signal through a hole in a mirror. The shape of the obstructive element may be based on a shape of the hole. The location of the obstructive element may be based on a location of the hole. A size of the obstructive element may be based on a size of the hole. The method may include increasing the optical aperture size using an afocal foreoptic. The method may include decreasing the directed optical signal divergence using an afocal foreoptic. The method may include recording the return optical signal at a focal plane.

Any two or more of the features described in this specification, including in this summary section, may be combined to form implementations not specifically described in this specification.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Figure 1:
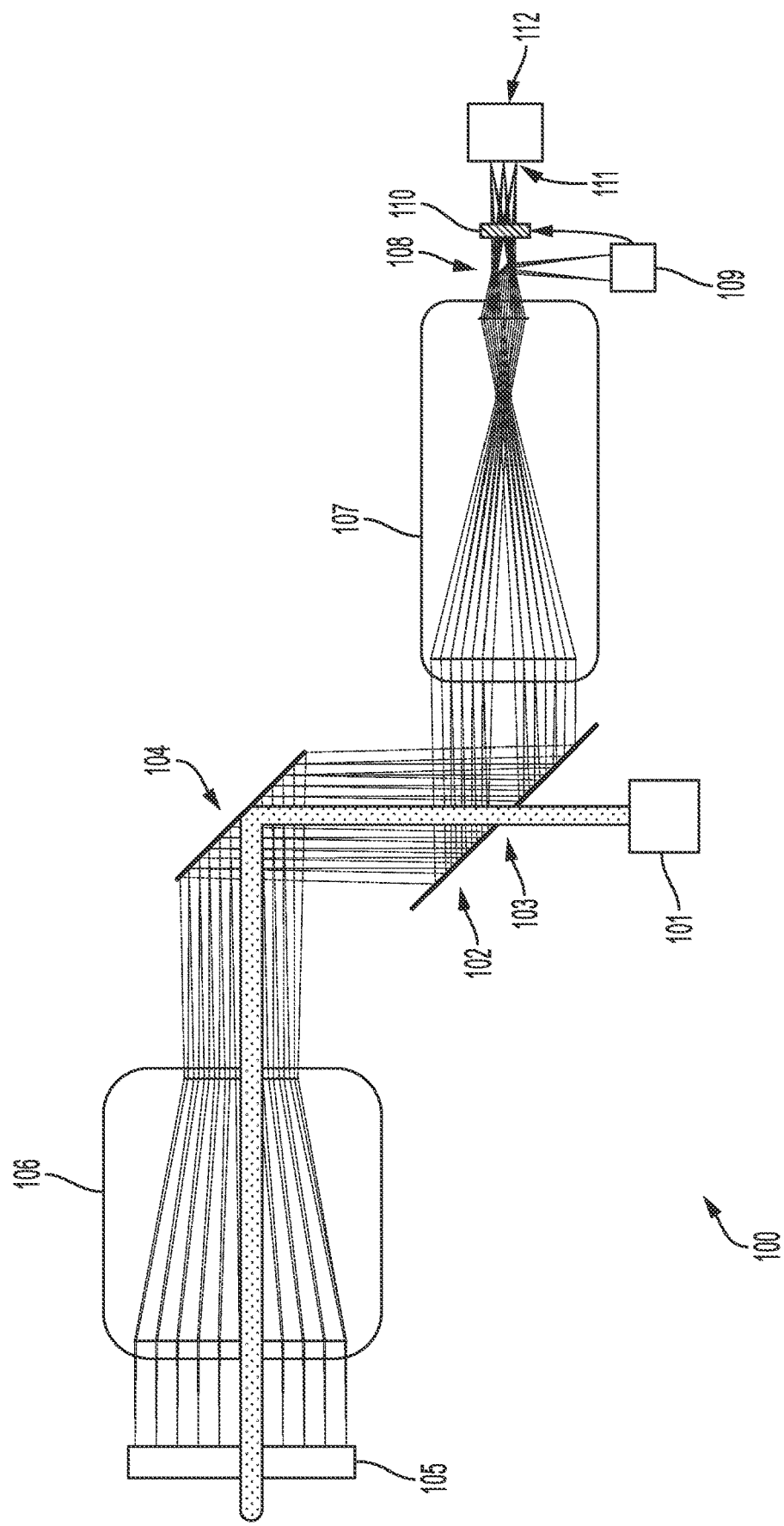
FIG. 1 is a block diagram of an example LADAR system.

An example active sensing optical system, such as a LIDAR or LADAR system, transmits light to a target and receives light back from the target. The transmitted light is also referred to herein as a directed optical signal and the received light is also referred to as a return optical signal. In an active sensing optical system, the transmitted light is separated from the received light. In some systems, the beam diameter of the transmitted light can be less than the beam diameter of the received light. For example, the beam diameter of the transmitted light may be 0.05 to 0.50 times the beam diameter of the received light. A way to separate the transmitted light from the received light in such systems includes using a mirror having a hole. The transmitted light passes through the hole and the received light reflects off the mirror and proceeds along an optical path to a focal plane of a receiver detector.

One challenge in LADAR and LIDAR is to align the transmit beam and the receive beam while avoiding a damaging level of signal to reach the receiver detector. Receiver electronics in LADAR systems may be sensitive to the amount of power incident on them and can be damaged. Accordingly, example systems may measure an attribute of the return optical signal, or receive beam, and correspondingly control an obstructive element to move into or out of a path of the return optical signal.

The system may include imaging optics that image or relay and, therefore, are referred to as an imager. The imager focuses the received light onto the receiver detector. The imager can generate an opportune location in the optical path that is conjugate to the hole in the mirror and, thus, provides a location where a fold mirror or other obstructive element can be placed. The fold mirror is a separate component from the mirror with the hole. The fold mirror is configured and arranged to reflect all or part of the return optical signal to a backscatter detector. The backscatter detector is configured to generate a measurement of an attribute of the return optical signal, such as the intensity of the return optical signal or other indicator of an amount of backscatter in the return optical signal. Based on the measurement, an obstructive element may be controlled to shield the receiver detector from seeing all or part of: the hole in the mirror, forward optical surfaces illuminated by the transmitted light, both the hole in the mirror and the illuminated forward optical surfaces, or an entirety of the return optical signal.

In some implementations, the system may include one or more of the following features. The transmitted light may operate at lower than full power during a duration in which the backscatter detector is operating. The transmitted light may operate at full power when a measurement of an attribute of the return optical signal is below a predefined threshold and the obstructive element is controlled to move out of a path of the return optical signal. If a measurement of an attribute of the return optical signal exceeds a predefined threshold, the measurement may be used to determine an operating power of the transmitted light. An attribute of the return optical signal can then be measured again. A measurement of an attribute of the return optical signal may be used to decide to replace an element in an optical path.

Thus, the example systems described herein include techniques for preventing the receiver detector from directly seeing at least some of the return optical signal. An obstructive element may be configured to block any return optical signal to prevent damage to the receiver detector.

FIG. 1 is a block diagram of an example LADAR system 100. LADAR system 100 includes a transmitter, such as a laser source, that emits a directed optical signal. A laser beam is an example of a directed optical signal. The directed optical signal passes through a hole in a mirror, and ultimately, through an optical aperture.

In system 100 the transmitter is optical transmitter 101. Transmitter 101 is configured to output a laser beam which, as noted, is a type of directed optical signal. An example laser beam includes a spatially-coherent beam of light. Types of transmitters that may be used include a solid-state laser, a fiber laser, a gas laser, a chemical laser, an excimer laser, a photonic crystal laser, a semiconductor laser, a dye laser, or a free-electron laser. The laser may be configured or controlled to output ultraviolet, visible, or near infrared light to image targets in a scene.

LADAR system 100 includes a mirror 102 configured to separate transmitted light (the directed optical signal) from received light (the return optical signal). To this end, mirror 102 includes a hole 103 that the laser beam may pass through, as explained above. The hole can be located at any appropriate location on the mirror, including on a plane of the mirror. The hole extends all the way through the mirror. By including a hole 103, transmitted light that is retroreflected may pass back through the hole 103. The mirror 102 also includes a reflective surface on an area that surrounds the hole. The reflective surface reflects at least part of the return optical signal received by the mirror.

LADAR system 100 may also include a first fold mirror 104. First fold mirror 104 may be configured and arranged to direct the laser beam received through the hole 103 towards an optical aperture 105 for output to a scene and target. Depending on the configuration of the system, first fold mirror 104 may be omitted or more than one fold mirror may be included to direct the laser beam towards optical aperture 105.

An afocal foreoptic 106 may be included between first fold mirror 104 and optical aperture 105. Afocal foreoptic 106 may be configured to increase size of the optical aperture and to decrease the transmitted beam divergence for greater range performance. Depending on the configuration of the system, the afocal foreoptic 106 may be omitted or more than one afocal foreoptic may be included.

From the afocal foreoptic 106, the laser beam passes through optical aperture 105. An optical aperture includes an opening through which light passes. The optical aperture may be shared, allowing light to pass in two directions. The directed optical signal is output through the optical aperture 105 to a beam field. The beam field includes a scene representative of a real-world space and a target of the optical signal is in the scene. The directed optical signal is reflected from the scene and target back to the optical aperture 105. This reflected signal is the return optical signal. The optical system receives the return optical signal through the optical aperture 105. Thus, the directed optical signal and return optical sign travel a common optical path through the optical aperture 105. This common optical path may reduce the number of components in the optical system.

Optical aperture 105 includes an opening through which light passes to the beam field that includes a scene and target. The optical aperture 105 is shared in this example. Optical aperture 105 is configured to transmit the laser beam to the scene and target and to receive the return optical signal that is based on the transmitted laser beam. In this regard, optical aperture 105 may be configured to receive the return optical signal at a particular angle and brightness based on the diameter of an opening in the optical aperture. Similarly, the optical aperture 105 may be configured to alter the angle of an emitted laser beam. Optical aperture 105 may include a transmissive optical device, such as a window or lens, which may converge or disperse the transmitted laser beam through refraction.

The beam field includes a scene that is representative of a real-world space. As explained above, the beam field also includes a target in the scene of the beam field. The laser beam impacts, and scans across, points in the scene and target. A control system for the LADAR system 100 may adjust the LADAR system 100 to control the scanning and to set the beam field containing the scene and target. For example, the laser beam may illuminate a spot on the target. The laser beam reflects from the target to produce the return optical signal. The return optical signal may represent multiple fieldpoints of the target. A fieldpoint includes features on the target that are illuminated by the laser beam. Scattered light may also be included in the return optical signal. The return optical signal has an intensity that is based, in part, on the target.

Optical aperture 105 may receive the return optical signal at a first pupil plane. The first pupil plane includes a location in optical aperture 105 where footprints of the return optical signal fieldpoints are in a single plane.

The return optical signal may contain backscatter. Backscatter includes scattered light in the return optical signal originating from the beam field or from within the optical system, such as from the optical aperture, rather than from the beam field. For example, the backscatter may be near-range backscatter. The near-range backscatter may be reflected from a target in close proximity to the LADAR system 100. In another example, the backscatter may include scattered light from within the optical system, such as from optical components in system 100, rather than from the beam field. This type of backscatter may be referred to as internal backscatter. Internal backscatter includes local internal backscatter. Local internal backscatter includes transmitted light that is directly scattered back in the direction of a focal plane from the portion of the optics used in the transmission path. As mentioned previously, hole 103 in mirror 102 and all of its forward projections, along with optical aperture 105, first fold mirror 104, and afocal fore-optic 106, may contribute to local internal backscatter. In some implementations, the local internal backscatter may be greater on the forward projections of the hole. For example, if hole 103 is centered on mirror 102, and the laser beam travels through the hole 103 and reflects on forward projections of the hole 103, backscatter may be greater at the projections of the hole 103 in the optical path than at other locations.

As noted above, the local internal backscatter may be caused by scattering or reflection off of optical aperture 105. For example, optical aperture 105 may include imperfections due to deterioration or environmental exposure. A lens or other glass included in the optical aperture 105 may have imperfections. Imperfections of this type may also be present in other system optical components.

In addition, the return optical signal may have an intensity that is great enough to damage a focal plane in the LADAR system and/or the return optical signal may have an intensity that is greater than a predetermined threshold. This intensity may be a result of an inordinate amount of backscatter in the return optical signal, for example. Thus, in addition to blocking at least some backscatter, the techniques described herein may reduce the chances of damage caused by high-intensity signals.

The return optical signal passes through aperture 105 and, from there, is received by afocal foreoptic 106. The return optical signal may then reflect from first fold mirror 104 and subsequently reflect from mirror 102 towards imager 107. Imager 107 receives the return optical signal and focuses the return optical signal intermediately. Imager 107 may include a series of optics to generate an image of the scene and target on focal plane 111 based on the return optical signal. The imager 107 may also form a second pupil plane. The second pupil plane is an optical conjugate of the first pupil plane such that fieldpoints at the first pupil plane are also present at the second pupil plane. The second pupil plane is also an optical conjugate to hole 103 in mirror 102. An optical conjugate may include image or object pairs. Optical elements may create an imaging relationship such that light which crosses one conjugate will recross at the other conjugate. If a point source is identified at a first optical conjugate, an image of that point source may be at a second optical conjugate. Likewise, if a point source is identified at a second optical conjugate, an image of the point source may be at the first optical conjugate. Accordingly, the second pupil plane may present at least some of the local internal backscatter at a predictable location based on the location of hole 103.

A fold mirror 108, referred to herein as the second fold mirror, is arranged within a path of the return optical signal to reflect at least a portion of the return optical signal to a backscatter detector ("detector") 109. As described below, the detector 109 is configured to detect one or more attributes of the return optical signal. An obstructive element may be controlled to move into or out of the optical path based on the detection performed by the detector, thereby blocking or passing all or part of the return optical signal.

The second fold mirror 108 includes a reflective surface. The second fold mirror 108 may have a shape that resembles the shape of hole 103. This shape allows the second fold mirror to direct the local internal backscatter in the forward projection of the hole to detector 109. The second fold mirror 108 may be located at the second pupil plane or at any other appropriate location in the optical path.

Thus, as indicated above, the size and/or shape of second fold mirror 108 may be based on the size and/or shape of the hole 103 in the mirror 102 or the projection of the hole 103 in the mirror. For example, the shape of the second fold mirror 108 may be identical to the shape of the hole 103. For example, the size of the second fold mirror 108 may be identical to the size of the hole 103. For example, the size or shape of the second fold mirror 108 may be identical to the size of a projection of the hole 103 at the second pupil plane. For example, the hole 103 in the mirror 102 may be circular and the second fold mirror 108 may be circular. The hole 103 in the mirror 102 may have the same radius as the second fold mirror 108. The shapes of the second fold mirror 108 and the hole 103 in the mirror 102 are not limited to circular but rather may have any appropriate shape, such as oval, polygonal, rectangular, and so forth.

The location of second fold mirror 108 may be based on the location of the hole 103 in the mirror 102. In some cases, the second fold mirror 108 may be positioned in the optical path at the forward projection, or shadow, of the hole. For example, if the hole is off-center on the mirror, the second fold mirror 108 may be off-center relative to a cross-section of an optical path between mirror 102 and focal plane 111 or off-center on the second pupil plane. For example, if the hole is centered on the mirror, the second fold mirror 108 may be centered relative to a cross-section a cross-section of the optical path between mirror 102 and focal plane 111 or centered on the second pupil plane.

In the example of FIG. 1, second fold mirror 108 is positioned at the second pupil plane between imager 107 and focal plane 111, although it is not limited to such positioning. By basing the shape, size, and/or location of the second fold mirror 108 on the shape, size, and/or location of the hole 103, all or some local internal backscatter in the return optical signal may be reflected to a detector without substantially reducing throughput of the optical signal to the focal plane 111. In some examples, because the second fold mirror 108 is positioned in the shadow of hole 103 at the second pupil plane, the second fold mirror 108 enables consistent return signal throughput.

In the configuration of FIG. 1, local internal backscatter in the forward projection of the hole 103 is blocked from reaching focal plane 111 and instead reflects to detector 109. The detector 109 may generate a measurement based on an attribute of the return optical signal. For example, the detector 109 may measure the intensity of the return optical signal, which is indicative of the amount of backscatter in the signal. The detector 109 may compare this measurement to a threshold. The threshold may be a value that is predefined and based on a damage threshold of the focal plane of the receiver. The detector 109 may output a signal corresponding to the comparison. A controller may receive this signal and may control an obstructive element 110 to move into or out of a path of the return optical signal so as to block or to partially block the return optical signal so that the field of view of the focal plane is obstructed. For example, the obstructive element 110 may block at least part of the focal plane from seeing all or part of the hole. As a result, focal plane 111 may be protected from a return optical signal having an attribute (e.g., an intensity) that exceeds a predefined or design tolerance.

In the example of FIG. 1, detector 109 may measure the intensity of the return optical signal and compare the resulting measurement to a threshold. In another example, detector 109 may measure another attribute indicative of an amount of backscatter in the return optical signal and compare the resulting measurement to a threshold. In some implementations, detector 109 may be calibrated to convert the measurement to a power value or power-per-area value for direct comparison to the threshold that is expressed as power or power-per-area. Based on the comparison, obstructive element 110 may be controlled to move into or out of the path of the return optical signal. The obstructive element 110 may be shaped to block all or part of the return optical signal from reaching the focal plane 111. For example, the obstructive element 110 may be or include a shutter that is controllable based on an output of the detector. Thus, if the detector output exceeds the threshold, obstructive element 110 may be controlled to move into the path of the return optical signal. On the other hand, if the detector output does not exceed the threshold, the obstructive element 110 may be controlled to move or stay out of the path of the return optical signal.

In some implementations, the second fold mirror 108 may be mounted or attached to the obstructive element 110 such that the second fold mirror 108 may be similarly move into or out of the path of the return optical signal based on an attribute of the return optical signal. For example, once an attribute of the return optical signal, such as a level of backscatter, has been measured by detector 109 and the attribute of the return optical signal is below a predefined threshold, the second fold mirror 108 mounted to the obstructive element 110 may be controlled to move out of the path of the return optical signal.

In some implementations, as explained in more detail below, the second fold mirror 108 may be configured to reflect a portion of the return optical signal to the detector 109, and may also be configured to allow a portion of the return optical signal to pass through the second fold mirror 108 towards focal plane 111. In this case, the second fold mirror 108 may be a partially reflective mirror. The second fold mirror 108 in such an example may or may not be positioned at the second pupil plane. As was the case in the examples described above, the detector 109 may generate a measurement based on an attribute of the return optical signal and the obstructive element 110 may be controlled based on an output of the detector 109.

Figure 2:
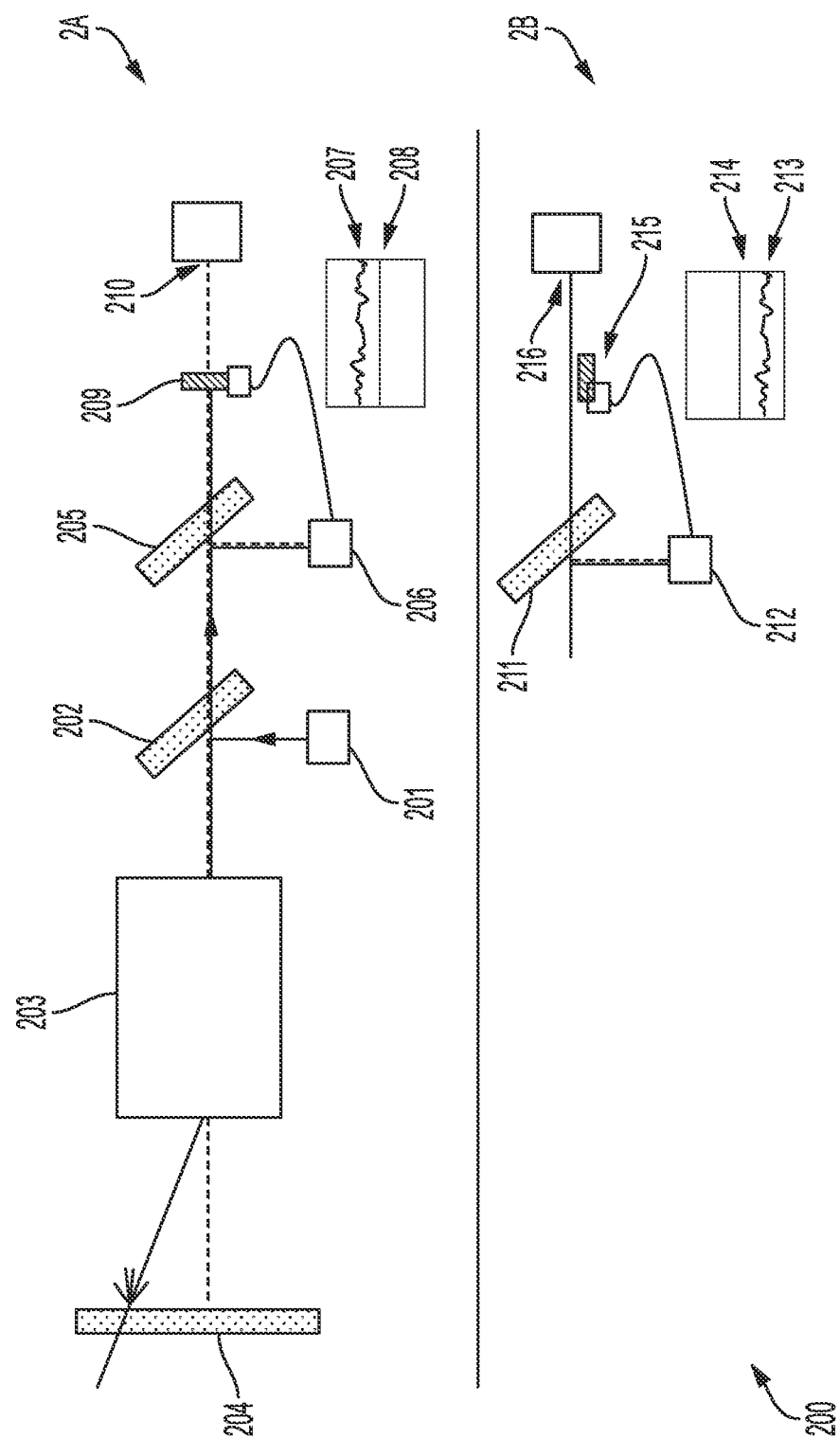
FIG. 2, comprised of FIGS. 2A and 2B, includes block diagrams showing configurations of example LADAR systems that pass all or part of an optical signal to a backscatter detector.

FIG. 2, comprised of FIGS. 2A and 2B, shows two configurations of example LADAR system 200. The LADAR system 200 includes a fold mirror 205, 211, which may have the same structure and function as the fold mirror of FIG. 1. In this regard, the elements of FIG. 2 referred to below may have the same structure and function as corresponding elements described above with respect to FIG. 1. In FIG. 2A, and as in other implementations, a transmitter 201, such as a laser, emits a directed optical signal through a hole in a mirror 202 and to a beam director 203. The beam director 203 directs the directed optical signal to the optical aperture 204. The beam director 203 may be or include an afocal foreoptic, a mirror, a fold mirror, or other additional optics not shown in FIG. 2. Depending on the configuration of the system, the beam director 203 may be omitted or more than one beam director 203 may be included.

The directed optical signal travels to a beam field. The beam field includes a scene representative of a real-world space. A target of the optical signal is in the scene. The directed optical signal is reflected from the scene and target. This reflected signal is the return optical signal. The LADAR system 200 receives the return optical signal through the optical aperture 204. The beam director 203 may relay the return optical signal to the mirror 202 and, from there, the return optical signal may be directed along the optical path to second fold mirror 205. The second fold mirror 205 in example LADAR system 200 may reflect a portion of the return optical signal to a detector 206. Another portion of the return optical signal may proceed through second fold mirror 205 towards a focal plane 210. For example, the second fold mirror 205 may reflect approximately 10% of the return optical signal to the detector while approximately 90% of the return optical signal proceeds through fold mirror 205 towards a focal plane 210. For example, the second fold mirror 205 may reflect approximately 5% of the return optical signal to the detector while approximately 95% of the return optical signal proceeds through second fold mirror 205 towards a focal plane 210.

As described above, the detector 206 may measure an attribute of the return optical signal. For example, the detector 206 may measure the amount of backscatter in the return optical signal by measuring an intensity of the return optical signal. If the amount of backscatter (as measured in intensity) is greater than a threshold 208, an obstructive element 209 may be controlled to move into a path of the return optical signal to block at least a portion of the return optical signal from reaching focal plane 210.

In FIG. 2B, if a measurement of an the backscatter in the return optical signal 213 is less than a threshold 214, then obstructive element 215 may be controlled to move or to stay out of the path of the return optical signal to allow all or some of the return optical signal to reach focal plane 216.

Figure 3:
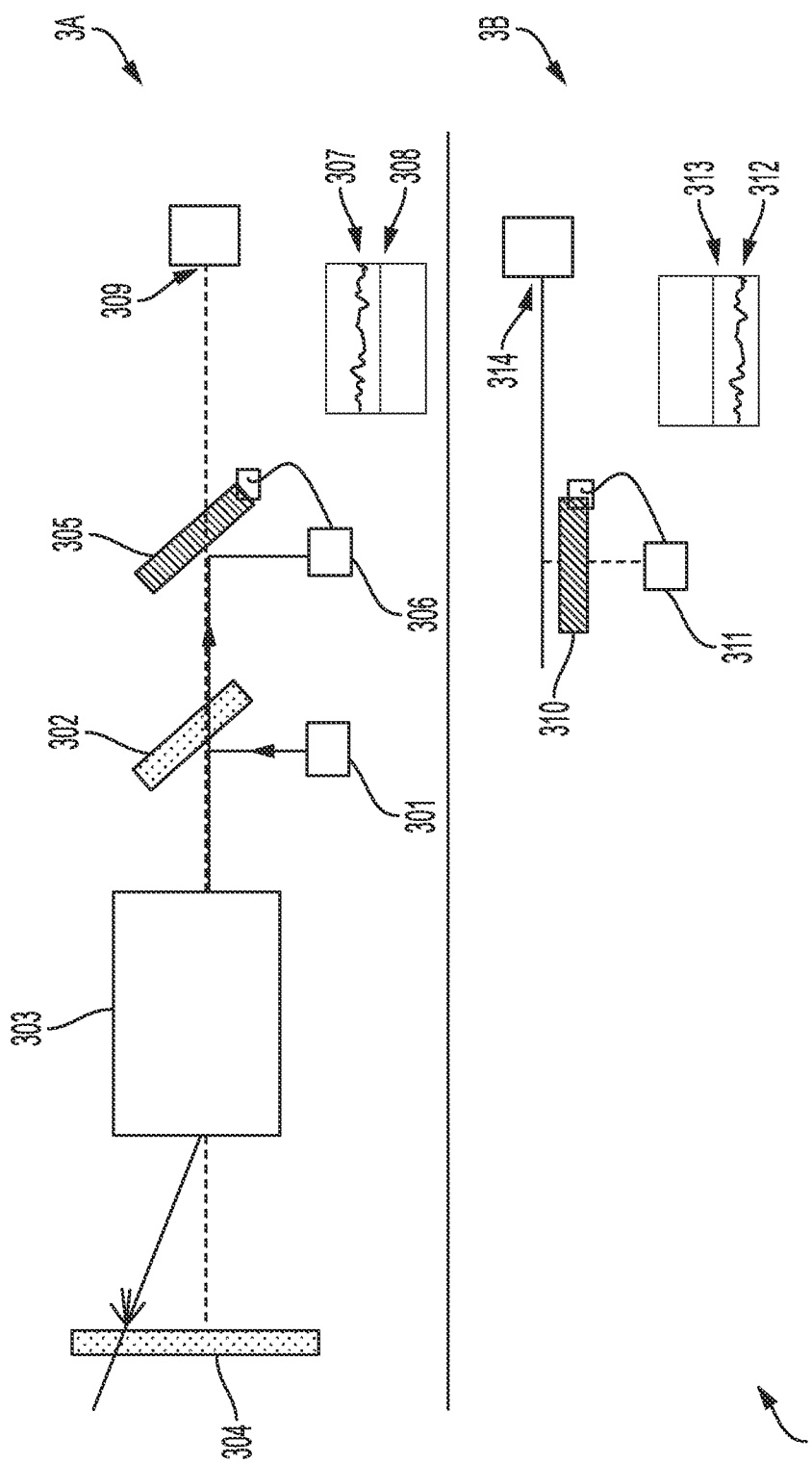
FIG. 3, comprised of FIGS. 3A and 3B, includes block diagrams showing alternative configurations of example LADAR systems that pass all or part of an optical signal to a backscatter detector.

FIG. 3, comprised of FIGS. 3A and 3B, shows two configurations of example LADAR system 300. The LADAR system 300 has an obstructive element 305, 310. In this example, the obstructive element 305, 310 also functions to reflect at least part of the return optical signal to a detector 306, 311. In FIG. 3A, and as in other implementations, a transmitter 301 emits a directed optical signal through a hole in a mirror 302 and to a beam director 303. The beam director 303 directs the directed optical signal to an optical aperture 304. The beam director 303 may include an afocal foreoptic, a mirror, fold mirror, or additional optics not shown in the figure. Depending on the configuration of the system, the beam director 303 may be omitted or more than one beam director 303 may be included.

The directed optical signal travels to a beam field. The beam field includes a scene representative of a real-world space. A target of the optical signal is in the scene. The directed optical signal is reflected from the scene and target. This reflected signal is the return optical signal. The LADAR system 300 receives the return optical signal through the optical aperture 304. The beam director 303 directs the return optical signal to the mirror 302. Mirror 302 reflects all or part of the return optical signal towards and to obstructive element 305 in the optical path.

The obstructive element 305 may be a fold mirror. The obstructive element 305 may be fully reflective and therefore may prevent passage of any part of the return optical signal. Accordingly, when in the optical path, the obstructive element 305 reflects the entirety of the return optical signal to a detector 306. As described above, the detector 306 may measure the amount of backscatter in the return optical signal by measuring an intensity of the return optical signal. If the amount of backscatter in the return optical signal 307 (as measured in intensity) is greater than a threshold 308, the obstructive element 305 may be controlled to remain in the path of the return optical signal to block the return optical signal from reaching focal plane 309. In FIG. 3B if the amount of backscatter in the return optical signal 312 is less than a threshold 313, then obstructive element 310 may be controlled to move out of the path of the return optical signal to allow at least a portion of the return optical signal to reach focal plane 314. For example, all of the return optical signal may reach focal plane 313.

All or part of the systems and processes described in this specification and their various modifications may be configured or controlled at least in part by a control system comprised of one or more processing devices. For example, the obstructive elements described herein may be controlled by one or more processing devices to move into or out of the optical path of a return optical signal. For example, the LIDAR or LADAR systems described herein may be computer-controlled.

Actions associated with configuring or controlling the systems and techniques described herein can be performed by one or more programmable processors executing one or more computer programs to control all or some of the well formation operations described previously. All or part of the systems and techniques can be configured or controlled by special purpose logic circuitry, such as, an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A laser detection and ranging system comprising:
   a transmitter configured to emit a directed optical signal;
   an optical aperture through which the directed optical signal is emitted, the optical aperture also to receive a return optical signal that is based on the directed optical signal;
   a detector to generate a measurement by comparing an attribute of the return optical signal to a predefined threshold, the measurement being based on an amount of backscatter in the return optical signal;
   an obstructive element that is controllable, based on the measurement, to move either into or out of a path of the return optical signal; and
   a focal plane located in the path of the return optical signal, the obstructive element being disposed between the optical aperture and the focal plane, the obstructive element to block at least a portion of the return optical signal from reaching the focal plane.

2. The laser detection and ranging system of claim 1, wherein the transmitter configured to emit a directed optical signal comprises a laser.

3. The laser detection and ranging system of claim 1, further comprising a mirror to reflect at least a portion of the return optical signal to the detector; and
   wherein the return optical signal may pass through the mirror to the focal plane.

4. The laser detection and ranging system of claim 1, wherein the obstructive element comprises a shutter.

5. The laser detection and ranging system of claim 1, wherein the obstructive element comprises a mirror.

6. The laser detection and ranging system of claim 4, wherein the mirror is a fold mirror.

7. The laser detection and ranging system of claim 1, further comprising an imager to receive the return optical signal and to generate an image of a scene and target, the image being based on at least a portion of the return optical signal; and
   wherein the focal plane is configured to record the image.

8. The laser detection and ranging system of claim 1, wherein the optical aperture comprises a first pupil plane.

9. The laser detection and ranging system of claim 8, further comprising a second pupil plane, the second pupil plane being an optical conjugate of the first pupil plane.

10. The laser detection and ranging system of claim 9, further comprising a mirror at the second pupil plane, the mirror being configured to reflect at least a portion of the return optical signal to the detector.

11. The laser detection and ranging system of claim 1, further comprising a mirror having a hole through which the directed optical signal passes.

12. The laser detection and ranging system of claim 1, further comprising an afocal foreoptic to increase the optical aperture size and decrease the directed optical signal divergence.

13. A method of shielding a focal plane of a camera within a laser detection and ranging system, the method comprising:

transmitting, through an optical aperture, a directed optical signal to a field;
receiving, through the optical aperture, a return optical signal based on the directed optical signal;
generating a measurement by comparing an attribute of the return optical signal to a predefined threshold; and
controlling an obstructive element to move into or out of a path of the return optical signal based on the measurement, the obstructive element to block at least a portion of the return optical signal from reaching a focal plane.

14. The method of claim 13, further comprising transmitting the directed optical signal through a hole in a mirror.

15. The method of claim 14, wherein a shape of the obstructive element is based on a shape of the hole.

16. The method of claim 14, wherein a location of the obstructive element is based on a location of the hole.

17. The method of claim 14, wherein a size of the obstructive element is based on a size of the hole.

18. The method of claim 13, further comprising increasing the optical aperture size using an afocal foreoptic.

19. The method of claim 13, further comprising decreasing the directed optical signal divergence using an afocal foreoptic.

20. The method of claim 13, further comprising recording the return optical signal at a focal plane.

* * * * *